ated Aug. 6, 1968

3,396,213
PREPARATION OF (MONOCYCLIC ARYL)METH-
YL, ALPHA, ALPHA - DITHIOL - BIS(O,O - DI-
ALKYLPHOSPHORODITHIOATE)
Donald W. Stoutamire, Modesto, Calif., assignor to Shell
Oil Company, New York, N.Y., a corporation of
Delaware
No Drawing. Filed Feb. 24, 1964, Ser. No. 347,013
4 Claims. (Cl. 260—978)

ABSTRACT OF THE DISCLOSURE

Preparation of a (monocyclic aryl)methyl-alpha,alpha-dithiol-bis(O,O-dialkylphosphorodithioate), by reacting a dialkyl dithiophosphoric acid with an acylal of a monocyclic aromatic aldehyde in the presence of a catalytic amount of sulfuric acid having a strength of 75% to 100% by weight sulfuric acid at a temperature between about 25° C. and about 100° C.

This invention relates to a process for preparing valuable insecticides. More particularly, this invention relates to a process for manufacturing toluene-alpha,alpha-dithiol bis(O,O-dimethyl phosphorodithioate), and related compounds of the general formula:

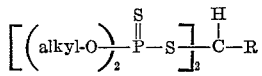

wherein each alkyl group contains from 1 to 4 carbon atoms and R is a monocyclic aromatic radical.

Toluene-alpha,alpha-dithiol bis(O,O - dimethyl phosphorodithioate) (for brevity, Compound A) has been found to be a highly effective insecticide, of particular value for control of mites, weevils, mosquitoes and worms. It therefore is desirable that there be available a process for its manufacture. Compound A is novel, so that the prior art does not teach a process for its preparation.

The most pertinent prior art known—U.S. Patents 2,873,228 and 2,882,198—teach that compounds of this class can be prepared by reacting a metal salt of the appropriate O,O-dialkyl dithiophosphoric acid with the appropriate aromatic-substituted methylene dihalide. However, it has been found that such a process cannot be used to prepare Compound A, for application of the process of these patents to the reactants that the patents teach to be appropriate for the preparation of Compound A did not result in any detectable amount of that compound.

It now has been found that Compound A can be readily prepared in high yield by reacting O,O-dimethyl dithiophosphoric acid with the alpha-acetoxybenzyl carbonium ion,

(phenyl-ĊH—O-acetyl)

in the presence of a catalytic amount of strong sulfuric acid. It further has been found that the reaction is applicable to the preparation of the corresponding O,O-di-(lower alkyl) dithiophosphate relatives of Compound A, and to related compounds in which the phenyl group is substituted, by reacting the appropriate dithiophosphoric acid (alkyl-O-)$_2$P(S)(SH) (for brevity, TA, for "thioacid") with the appropriate aromatic-acyloxymethyl carbonium ion,

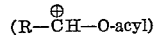
(R—ĊH—O-acyl)

in the presence of a catalytic amount of strong sulfuric acid.

In this process, the suitable thioacids are those O,O- di(lower alkyl) dithiophosphoric acids of the formula (alkyl-O-)$_2$P(S)(SH), wherein each alkyl group contains from 1 to 4 carbon atoms, and may be of either straight-chain or branched-chain configuration. Suitable TA reactants include, for example, the O,O-dimethyl, O,O-diethyl, O,O-dipropyl, O,O-diisopropyl, O,O-dibutyl, O,O-di-sec-butyl, O,O-di-tert-butyl, O-methyl, O-ethyl, O-methyl, O-propyl and O-ethyl, O-propyl esters of dithiophosphoric acid.

The suitable carbonium ions are prepared in situ in the reaction mixture by the following technique.

In this process the appropriate acylal,

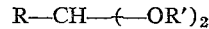

(R'=acyl) is reacted with the TA reactant in the presence of the catalyst. In this case, preformed acylal can be used. Preferably, however, the acylal is prepared by reacting the appropriate aldehyde with the appropriate carboxylic acid anhydride in the presence of strong sulfuric acid as catalyst, then reacting the resulting mixture (without separation of the acylal) with the TA reactant, if necessary adding additional strong sulfuric acid as catalyst.

This technique is desirable since it permits addition of the least stable reactant as the final ingredient, and in addition has been found to aid in more effectively converting aldehydes that are substituted by one or more electron-withdrawing substituents to the desired product, apparently by reducing side reactions.

The process of the invention is conducted by mixing the TA reactant with the acylal in the presence of the catalyst, and preferably the acylal is prepared by reacting the aldehyde and anhydride in the presence of the catalyst, then reacting the resulting mixture with the TA reactant, adding additional catalyst if necessary.

The reaction of the TA reactant with the carbonium ion is in general exothermic, and proceeds readily without heating the reaction mixture. However, in some cases, gentle heating of the mixture may be required to initiate the formation of the carbonium ion and/or to initiate reaction thereof with the TA reactant, and/or the reaction mixture may be heated gently after all of the reactants have been mixed, to insure completion of the reaction. Where the reaction proceeds readily, the temperature of the mixture may be controlled by controlling the rate at which the TA reactant is added and/or by suitable cooling means. Suitable reaction temperatures lie within the range of from about 15° C. to about 100° C., with preferred temperatures being about 30–70° C.

The reaction of the aldehyde and anhydride to form the acylal is in most cases quite exothermic and proceeds readily, so that cooling is necessary to maintain the reaction temperature below about 100° C. and preferably below 60° C. To attain completion of the reaction in reasonable time, a reaction temperature of at least 25° C. should be maintained.

The suitable substituted aldehydes include those wherein the phenyl ring (i.e., R) is substituted by from one to a plurality of alkyl, halogen (particularly fluorine, bromine and chlorine), nitro, hydroxy, cyano, amino (—NH$_2$, —NH(alkyl), —N(alkyl)$_2$), alkyl mercapto and/or alkoxy, in all of these cases, alkyl having the meaning already set out. In the process of the invention, aldehydes substituted by electron-withdrawing substituents, such as halogen and nitro, tend to be less reactive than those substituted by electron-donating substituents, such as hydroxy, alkoxy and alkyl. Typical examples of suitable aldehyde reactants include: benzaldehyde, o-nitrobenzaldehyde, p - nitrobenzaldehyde, 2,4 - dichlorobenzaldehyde, 2,6-dichlorobenzaldehyde, 4-bromobenzaldehyde, 2-chlorobenzaldehyde, p-methoxybenzaldehyde, p-methylbenzaldehyde, o-hydroxybenzaldehyde, 2-chloro-4-methylbenzaldehyde, 2-chloro-4-hydroxybenzaldehyde, p-aminobenzaldehyde, p-tertiary-butylbenzaldehyde, 3,5-dimethoxybenzaldehyde, and the like.

While carboxylic acid anhydrides generally are suitable, the lower molecular weight anhydrides—those containing not more than about 12 carbon atoms—are to be preferred. The anhydride may be aliphatic, including alicyclic, in character. The acyl group R', may be saturated or olefinically unsaturated. It may be aromatic in character. It may be substituted by one or more of the substituent groups described with respect to the suitable aldehydes. It may contain one or more oxy (—O—) linkages. Suitable anhydrides include, for example, acetic anhydride, propionic anhydride, chloroacetic anhydride, succinic anhydride, maleic anhydride, n-butyric anhydride, n-valeric anhydride, hexanoic anhydride, n-heptanoic anhydride, citraconic anhydride, cis-4-cyclohexene-1,2-dicarboxylic anhydride, isobutyric anhydride, trifluoroacetic anhydride, pyrotataric anhydride, glutaric anhydride, dichloroacetic anhydride, itaconic anhydride, 4-methyl-4-cyclohexene - 1,2 - dicarboxylic anhydride, phthalic anhydride, benzoic anhydride, tetrachlorophthalic anhydride, tetrabromophthalic anhydride, 3-nitrophthalic anhydride, tetraiodophthalic anhydride, naphthalic anhydride, trimellitic anhydride, 3 - chlorophthalic anhydride, 4 - chlorophthalic anhydride, 4-methylphthalic anhydride, pyromellitic dianhydride, and the like. Particularly preferred because of their reactivity are the alkanoic acid anhydrides containing from 1 to 4 carbon atoms. Of particular interest because of its effectiveness, availability and low cost is acetic anhydride.

The catalyst used is strong sulfuric acid—that is, sulfuric acid of at least 75% by weight $H_2SO_4$. Commercial concentrated sulfuric acid—containing about 96–97% by weight $H_2SO_4$ is quite suitable and is ordinarily to be preferred since it is available commercially at low price. Desirably, the $H_2SO_4$ concentration should not exceed 100% by weight—that is, fuming sulfuric acid, oleum, is not suitable.

In the process of the invention a catalytic amount of the catalyst is used, by which is meant at least about 0.01 percent by weight, based on the weight of the TA reactant (aldehyde in the aldehyde-anhydride reaction) used. In general, not more than about ten percent of the catalyst, on the same basis, will be required, and in most cases an amount of catalyst within the range of from about 0.1 to about one percent, on the same basis, will be found most useful.

At least one mole of the TA should be used per mole of the acylal, and preferably from about 1.5 to 2 moles of the TA are used per mole of the acylal. However, a slight-to-moderate excess of the TA over this amount—say, a 10% to 50% excess—may be found desirable.

In this process, approximately equimolar amounts of the aldehyde and anhydride are suitably employed. However, a slight-to-moderate excess of either (say, 5–50% excess) may be desirable in a given case.

It has not been found necessary to employ a solvent or diluent in the reaction mixture. However, to moderate the reaction of the carbonium ion with the TA reactant (or the aldehyde with the anhydride), an inert liquid may be used, suitable liquids including carboxylic acids, such as acetic acid, or any of the common solvents such as ethers, aromatics hydrocarbons, chlorinated aromatic hydrocarbons and the like. An alcohol can be used if it corresponds to the alkyl in the thioacid reactant to avoid transesterification.

The pressure under which the reaction is conducted is not known to be critical to the attainment of the desired product. Substantially atmospheric, superatmospheric or subatmospheric pressures may be employed as convenient or required by the physical characteristics of the components of the reaction mixture.

The product of the process of this invention ordinarily is most effectively and conveniently recovered by stripping any light materials from the crude reaction mixture, and/or extracting the mixture with a selective solvent, then employing crystallization techniques to isolate and purify the product.

The following specific examples of the conduct of the process of the invention are set forth to illustrate application of the process in particular instances. In these examples, "parts" means parts by weight unless otherwise expressly indicated, and parts by weight bears the same relationship to parts by volume as does the kilogram to the liter.

Example I

A mixture of 10.6 parts of benzaldehyde and 11 parts of acetic anhydride was cooled to 5° C. and two drops of concentrated sulfuric acid was added. The temperature rose rapidly to 70° C. After 10 minutes, 32 parts of O,O-dimethyl dithiophosphoric acid was added, in portions, with mixing and cooling to maintain the reaction mixture temperature at 50–55° C. The mixture then was allowed to stand for 5 minutes, then was heated briefly to 70° C., then cooled and diluted with water. The water-insoluble oil was separated, and after it crystallized, the crystalline material was ground up in a mortar, filtered, and washed with water. Drying to constant weight gave 40 parts (99% yield) of Compound A.

Example II 1600 parts of benzaldehyde (technical, 85% purity) was added over a 40-minute period with stirring and cooling to maintain a reaction temperature of 25–50° C. to a solution of 2.5 parts by volume of concentrated sulfuric acid in 1410 parts of acetic anhydride (95% purity). The mixture then was held for 15 minutes at about 50° C., then allowed to stand and cool for one hour. 2.5 parts by volume of additional concentrated sulfuric acid was added, the mixture was warmed to 40° C., then 4766 parts of O,O-dimethyl dithiophosphoric acid was added over a 1.5-hour period, with mixing and cooling to maintain the reaction mixture temperature at 50–55° C. The mixture then was stirred for an additional 2 hours at the same temperature, then allowed to stand overnight at room temperature and filtered to give a solid product. Dilution of the filtrate gave additional product. Total product: 4770 parts (92% yield) of Compound A.

Example III

By the technique demonstrated in Examples I and II, there were prepared the following:

(a) o - chlorotoluene-alpha,alpha-dithiol bis(O,O-dimethyl phosphorodithioate), melting point: 64–65° C.; from acetic anhydride, o-chlorobenzaldehyde and O,O-dimethyl dithiophosphoric acid;

(b) p - chlorotoluene-alpha,alpha-dithiol bis(O,O - dimethyl phosphorodithioate), melting point: 54–56° C.; from acetic anhydride, p-chlorobenzaldehyde and O,O-dimethyl dithiophosphoric acid;

(c) 2,6-dichlorotoluene-alpha,alpha-dithiol bis(O,O-dimethyl phosphorodithioate), melting point: 92.5–94° C.; from acetic anhydride, 2,6-dichlorobenzaldehyde and O,O-dimethyl dithiophosphoric acid;

(d) m - nitrotoluene - alpha,alpha - dithiol bis(O,O-dimethyl phosphorodithioate), melting point: 45–48° C.; from acetic anhydride, m-nitrobenzaldehyde and O,O-dimethyl dithiophosphoric acid;

(e) p-nitrotoluene-alpha,alpha-dithiol bis(O,O-dimethyl phosphorodithioate), melting point: 76–80° C.; from acetic anhydride, p-chlorobenzaldehyde and O,O-dimethyl dithiophosphoric acid;

(f) o - xylene-alpha,alpha - dithiol bis(O,O-dimethyl phosphorodithioate), melting point: 66–68° C.; from acetic anhydride, o-methylbenzaldehyde and O,O-dimethyl dithiophosphoric acid.

I claim as my invention:
1. A process for preparing compounds of the formula:

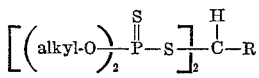

wherein each alkyl contains from 1 to 4 carbon atoms and R is a monocyclic aromatic radical which comprises reacting a dialkyl dithiophosphoric acid, (alkyl—O—)$_2$—P(S)(SH)

with an acylal of a monocyclic aromatic aldehyde of the structure

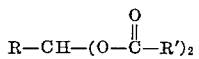

wherein R' is alkyl of up to six carbon atoms,
alkenyl of up to six carbon atoms,
or monocyclic aromatic, wherein the aromatic ring of R and R' is unsubstituted or substituted from one to a plurality of fluorine,
bromine,
chlorine,
nitro,
hydroxy,
[cyano; and]
—NH$_2$,
aralkoxy, of one to four carbon atoms, in the presence of a catalytic amount of sulfuric acid having a strength of 75% to 100% by weight sulfuric acid at a temperature between about 25° C. and about 100° C.

2. A process according to claim 1 wherein the acylal is prepared by the reaction of an aldehyde of the structure

and a carboxylic acid anhydride of the structure

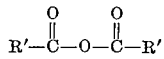

in which R and R' are as described in claim 1, in the presence of a catalytic amount of sulfuric acid having a strength of 75% to 100% by weight sulfuric acid at a temperature between about 25° C. and about 100° C. the source of the acylal reacted with the dithiophosphoric acid being the crude aldehyde-anhydride reaction mixture.

3. A process for preparing toluene-alpha,alpha-dithiol bis(O,O-dimethyl phosphorodithioate) which comprises reacting O,O-dimethyl dithiophosphoric acid with benzylidene diacetate in the presence of a catalytic amount of sulfuric acid having a strength of 75% to 100% by weight sulfuric acid at a temperature between about 25° C. and about 100° C.

4. A process according to claim 3 wherein the benzylidene diacetate is prepared by reaction of benzaldehyde and acetic anhydride in the presence of a catalytic amount of strong sulfuric acid, having a strength of 75% to 100% by weight sulfuric acid at a temperature between about 25° C. and about 100° C. the source of the benzylidene diacetate reacted with the dithiophosphoric acid being the crude benzaldehyde-acetic anhydride reaction mixture.

References Cited

Shell, Chemical Abstracts, vol 59 (1963), p. 9891.

CHARLES B. PARKER, *Primary Examiner.*

A. H. SUTTO, *Assistant Examiner.*